Patented Dec. 1, 1942

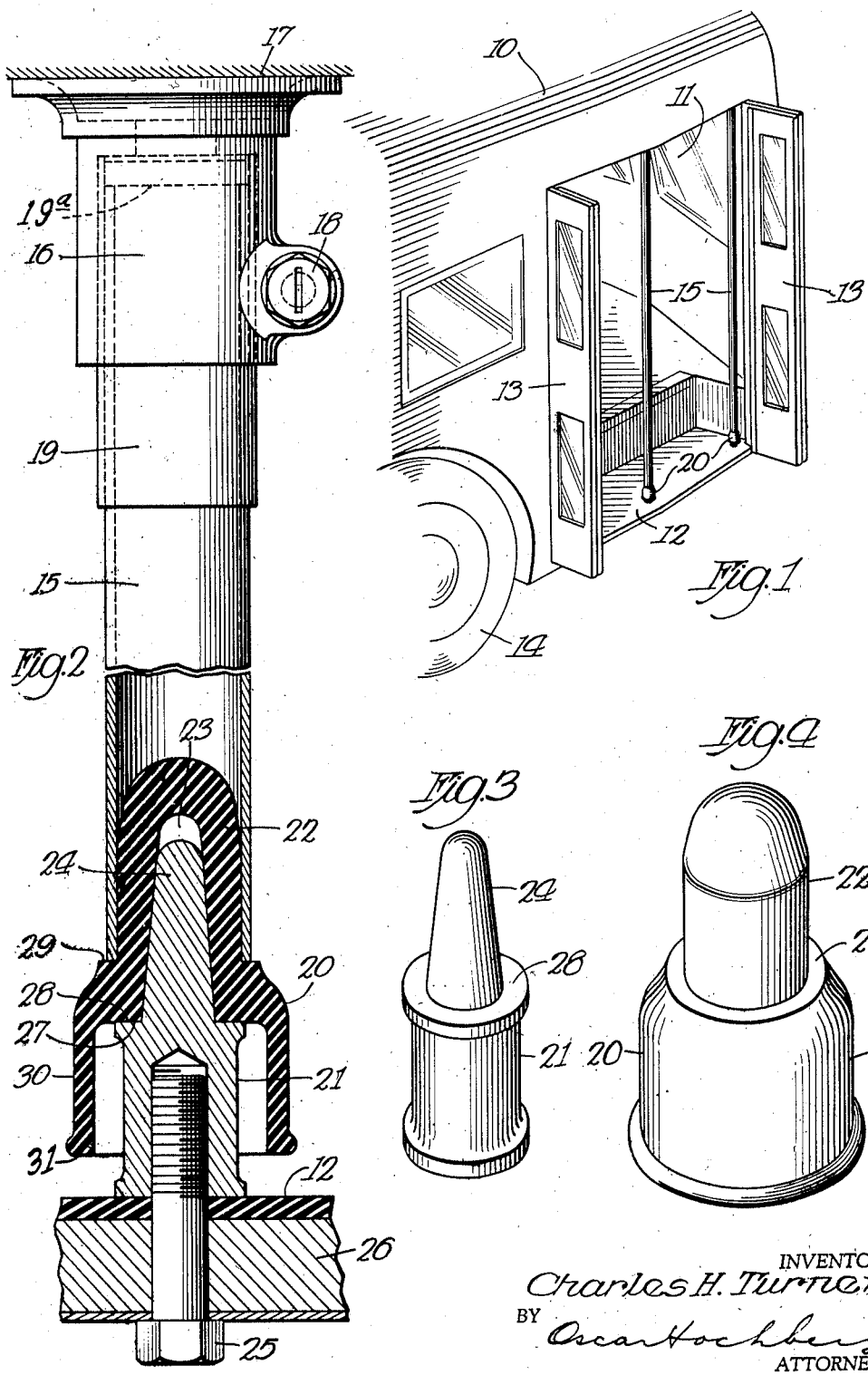

2,303,670

UNITED STATES PATENT OFFICE 2,303,670

STANCHION FOR TROLLEY VEHICLES

Charles H. Turner, Worcester, Mass., assignor to Pullman-Standard Car Manufacturing Company, Chicago, Ill., a corporation of Delaware Application February 8, 1940, Serial No. 317,853

4 Claims. (Cl. 174—138)

The invention relates to self-propelled vehicles of the type receiving electrical current through a trolley and, more particularly, to such vehicles equipped with wheels which insulate the vehicles against electrical connection with a ground and which are provided with a two-trolley arrangement to provide a ground return for the current. In vehicles of this character, it is possible, due to the leakage of current to the framework thereof caused by various factors, for a person taking hold of and stepping onto the vehicle thereby to provide a ground and receive an electrical shock of variable consequence depending upon conditions incident to the cause of the shock. Therefore, it is the particular object of this invention to provide means whereby persons entering a vehicle of the type referred to are prevented from receiving a shock of this nature.

Specifically, the object of this invention is the provision of stanchions for trolley vehicles affording definite and permanent electrical insulation from the vehicle framing unaffected by moisture or other external factors.

The foregoing and other objects are attained by the construction illustrated in the accompanying drawing, in which—

Fig. 1 is a general perspective view of a trolley vehicle with portions broken away and depicting the entrance doors in open position to reveal the stanchions constructed in accordance with this invention;

Fig. 2 is an enlarged detail view of the stanchion and its top and bottom connections with portions broken away better to reveal the invention;

Fig. 3 is a detail perspective view of the bottom attaching member for the stanchion; and Fig. 4 is a general perspective view of the insulator used in the bottom connection of the stanchion.

In the construction of trolley coaches, difficulties have been experienced in securing definite electrical insulation at the bottom of the stanchions which are located in the doorways because of the effects of moisture. These stanchions may be grasped by passengers leaving or entering the coach and who might have at least one foot on the ground at the same time they take hold of the stanchion, and, therefore, if, for any reason, any electrical current leakage to the framework of the coach might be taking place, a direct circuit will be completed by the passenger to ground, causing the passenger to receive an electrical shock due to the fact that the coach is insulated from ground by rubber tires and the passenger in contact with the ground provides a direct path for the current from the stanchion. The conventional method of applying insulation at the base of these stanchions has been accomplished by the insertion of a non-conducting sleeve or bushing and washers between the stanchion and its base socket; but it is possible for an arrangement of this kind to be short-circuited by the effects of moisture, and, in order definitely to overcome the difficulties heretofore encountered, applicant has designed a moulded rubber insulator which eliminates any actual metal-to-metal contact between the stanchion and its bottom connection and provides definite dry-spot insulation at all times.

In the drawing, 10 represents a trolley coach having a doorway 11 containing a step well 12 and closed by folding doors 13. The coach is supported on rubber-tired wheels 14 and, for this reason, is propelled by means of electrical current received from a two-wire trolley system through suitable trolley poles (not shown) in order that a ground return for the current might be provided designed to take the place of the usual rails utilized for that purpose. It has proven difficult, however, to prevent current leakage in vehicles of this type to the framework of the vehicle and which reaches stanchions 15 in the doorway 11 due to the fact that the trolley coach is not grounded directly as in the case of rail cars.

The stanchions 15 comprise tubular, metallic members removably secured in upper attaching brackets 16, in the headlining 17, by means of bolts 18 clamping the brackets about the stanchions as shown in Fig. 2. The stanchions are insulated from the brackets 16 by means of sleeves 19 of non-conducting material inserted between the stanchions and the brackets and having washers 19a of similar material between the ends of the stanchions and the brackets. Insulation of the stanchion from the vehicle framing is to prevent the current from reaching a grounded passenger boarding or leaving the vehicle, and for this purpose a moulded rubber insulator 20 is provided between the bottom of the stanchion and its bottom connection member 21 affording positive insulation therebetween by the elimination of any metal-to-metal contact between the stanchion and any part of the vehicle framing or part connected with the framing. The insulator 20 may be composed of any non-conducting material impervious to moisture and, as here shown, is comprised of live rubber moulded to the desired contours and having sufficient resiliency to insure a tight fit and prevent rattling.

The insulator is provided with a projection 22 adapted to be received within the open bottom end of the stanchion 15 and which is hollow as at 23, by means of which the insulator may be inserted into the stanchion, since, by applying pressure in the end of the recess 23, the rubber of the projection 22 is stretched during application, thereby reducing the outside diameter to permit insertion in the stanchion; and, when the pressure is removed, the rubber expands to provide a tight frictional fit therein. The recess 23 also serves the further useful function of interlocking with an extension 24 on the bottom connection spool member 21 to provide an anchorage for the stanchion. The spool 21 is removably secured in the bottom tread 26 of the step well 12 by means of a bolt 25 penetrating the step tread and threaded into the bottom of the spool.

The bottom 27 of the insulator 20 seats upon shoulder 28 provided upon the supporting spool 21 about the extension 24, and an annular shoulder 29 on the insulator affords a seat for the stanchion 15; and it will be seen that a thickness of rubber intervenes between the stanchion and the extension 24 or the seat 23, thereby preventing metal-to-metal contact and thereby avoiding conduction of electrical current. It will be noted that the stanchion projects downwardly over the upstanding portion 22 and extension 24 sufficiently to provide an overlapping zone therebetween such as to preclude any tendency of the anchoring spool 21 toward upsetting and thereby preventing any possibility of disengagement of the interlocking relation between the parts.

To provide definite dry-spot insulation, the insulator 20 is provided with a depending annular skirt or shield 30 giving the insulator a bell-like shape and affording a watershed encircling the spool 21 in spaced relation thereto and terminating short of the surface of the step tread 26 to provide a shroud for the anchorage member 21 spaced not only from that member but also from the supporting surface so that a dry area will always be afforded where moisture cannot provide a path for conduction of stray electrical currents. Any moisture collecting on the stanchion or on the insulator will drip off of the shroud 30 without affording a path through which electrical current can travel due to the definite dry-spot provided by the shield. What the shroud 30 does is to provide a moisture-shedding or drip surface 31 spaced from the stanchion and its bottom attaching member and the supporting surface in the step well so that moisture accumulating thereon cannot provide a continuous conducting path across the insulator, whereby the insulator might be said to act as an umbrella to provide definite dry-spot insulation. Due to its inherent flexibility, the shield 30, when kicked or brushed against by persons entering the trolley coach, will give and thereby avoid injury to and scuffing of the shoes of such persons.

What is claimed is:

1. A stanchion, an anchor for the stanchion comprising an unstanding spindle, means for securing the spindle to a supporting surface, an extension on the spindle, a shoulder at the base of the extension, an insulator for mounting one end of the stanchion in spaced, insulated relation upon the supporting surface seated on said shoulder, a projection on the insulator adapted to be received in the end of said stanchion and having an axial recess adapted to receive said extension, a shoulder on the insulator at the base of said projection against which the stanchion is adapted to seat, and a shield on said insulator adapted to provide a dry spot between said upstanding spindle and the stanchion.

2. A stanchion, an anchor for the stanchion comprising an upstanding spindle, an extension on the spindle, a shoulder at the base of the extension, an insulator for mounting an end of the stanchion in spaced insulated relation to the spindle seated on said shoulder, the insulator being adapted to be received in the end of said stanchion and having a recess adapted to receive said extension, a shoulder on the insulator in substantial alignment with said first shoulder against which the stanchion is adapted to seat, and a shield on the insulator adapted to provide a dry spot between said upstanding spindle and the stanchion.

3. A stanchion, means for securing the stanchion to a supporting surface including an upstanding spindle having a portion adapted to extend within the stanchion and a part adapted to support the stanchion, an insulator for mounting one end of the stanchion in spaced insulated relation to said means adapted to be received in said end of the stanchion, said insulator having a lower shoulder seated on the spindle and an upper shoulder seating the stanchion and having a section thereof disposed between the stanchion and said part and a recess adapted to receive said portion, and a shield on the insulator adapted to provide a dry spot between the spindle and the stanchion.

4. A stanchion, means for securing the stanchion to a supporting surface including an upstanding spindle having a portion adapted to extend within the stanchion and a part adapted to support the stanchion, a resilient insulator for mounting one end of the stanchion in spaced insulated relation to said means adapted to be received in said end of the stanchion, said insulator having a section thereof disposed between the stanchion and said part and a recess adapted to receive said portion, and a shield on the insulator adapted to provide a dry spot between the spindle and the stanchion, said spindle, insulator and stanchion being disposed in interlocking relation by the successive entrance of one within the other and the stability of the stanchion with respect to said supporting surface being maintained through said interlocking relation.

CHARLES H. TURNER.